United States Patent [19]

Jacobs

[11] Patent Number: 5,761,502
[45] Date of Patent: Jun. 2, 1998

[54] SYSTEM AND METHOD FOR MANAGING A TELECOMMUNICATIONS NETWORK BY ASSOCIATING AND CORRELATING NETWORK EVENTS

[75] Inventor: Andrew Robin Jacobs, Colorado Springs, Colo.

[73] Assignee: MCI Corporation, Washington, D.C.

[21] Appl. No.: 581,262

[22] Filed: Dec. 29, 1995

[51] Int. Cl.$^6$ .......................... G06F 11/22; G06F 15/173
[52] U.S. Cl. .............. 395/614; 395/183.02; 395/200.11; 395/200.15; 395/610; 395/614; 379/220; 379/279
[58] Field of Search ........................... 395/610, 615, 395/614, 200.02, 200.11, 200.15, 183.02; 379/279, 220

[56] References Cited

U.S. PATENT DOCUMENTS

| | | | |
|---|---|---|---|
| 4,825,206 | 4/1989 | Brice, Jr. et al. | 340/825.02 |
| 5,159,685 | 10/1992 | Kung | 395/183.02 |
| 5,164,983 | 11/1992 | Brown et al. | 379/265 |
| 5,182,744 | 1/1993 | Askew et al. | 370/16 |
| 5,228,038 | 7/1993 | Jestice et al. | 370/110.1 |
| 5,337,320 | 8/1994 | Kung | 395/183.02 |
| 5,388,189 | 2/1995 | Kung | 395/50 |
| 5,404,565 | 4/1995 | Gould et al. | 395/800 |
| 5,446,874 | 8/1995 | Waclawsky et al. | 395/575 |
| 5,448,632 | 9/1995 | Iyob et al. | 379/201 |
| 5,459,777 | 10/1995 | Bassa et al. | 379/133 |
| 5,483,637 | 1/1996 | Winokur et al. | 395/183.02 |
| 5,493,689 | 2/1996 | Waclawsky et al. | 395/821 |
| 5,504,921 | 4/1996 | Dev et al. | 395/800 |
| 5,513,171 | 4/1996 | Ludwiczack et al. | 370/13 |
| 5,513,343 | 4/1996 | Sakano et al. | 395/183.02 |
| 5,655,081 | 8/1997 | Bonnell et al. | 395/200.32 |

OTHER PUBLICATIONS

Lazar, "An Architecture for Real-Time Control of Broadband Networks," *IEEE Global Telecommunications Conference*, vol. 1, pp. 289–295, Dec. 2, 1991.

Schapeler et al., ATD-specific network management functions and TMN architecture, *Electronics & Communication Engineering Journal*, vol. 4, No. 5, pp. 323–330, Oct. 1992.

Manione et al., "An Inconsistencies Tolerant Approach in the Fault Diagnosis of Telecommunications Networks," *Proceedings of the Network Operations and Management Symposium: IEEE*, vol. 2, pp. 459–469, Feb. 14, 1994.

Haritsa et al., "Mandate: Managing Networks Using Database Technology," *IEEE Journal on Selected Areas in Communications*, vol. 11, No. 9, pp. 1360–1372, Dec. 1993.

Stratman, "Development of an Integrated Network Manager for Heterogeneous Networks Using OSI Standards and Object-Oriented Techniques," *IEEE Journal on Selected Areas in Communications*, vol. 12, No. 6, pp. 1110–1120, Aug. 1994.

*Primary Examiner*—Thomas G. Black
*Assistant Examiner*—Jean R. Homere

[57] ABSTRACT

System and method for managing telecommunications networks. The state of network elements is managed by associating and correlating network events across many different network domains. Network elements include tangible elements, such as hardware and equipment, and non-tangible elements, such as customers, countries, and services. By incorporating an inferencing engine or expert system, sources of network problems are inferred, impacts of network events are assessed, and corrective actions are recommended.

43 Claims, 13 Drawing Sheets

FIG. 6

| DESTINATION | CCODE | SWITCH | ROUTE | ROUTE % ASR | DEST % ASR | DEST % OVFL | SIGNAL FAIL | B-CAT EOS | B-CAT % FAIL | CKTS BLK/TOT | TRANSOUT DS3 EPT | TRANSOUT BRK PT | TYPE |
|---|---|---|---|---|---|---|---|---|---|---|---|---|---|
| BRACKNELL-UK/MCL | 044 | POT3 | 0521 | | | | | | | 40/120 | | | |
| FRANKFURT/VAC GERM | 049 | WRG7 | 1296 | 3 | | | | | | | | | |
| DUESSELDORF/VAA GE | 049 | POT3 | | | | | | | | | | | |
| PERU | 051 | POT3 | | | 8 | | C7 | | | | | | |
| CHILE | 056 | DMH4 | | | 4 | | | | | | | | |
| VENEZUELA CARACAS | 058 | POT3 | 1247 | | | | | | | 30/30 | | | |
| KUALA LUMPUR/KELANA | 060 | DMH4 | 0417 | 0 | | | | | | | | | |
| AUSTRALIA | 061 | POT3 | | | 19 | | | | | | | | |
| AUSTRALIA | 061 | DMH4 | | | 6 | | | | | | | | |
| JAKARTA (SGI-1A) IN | 062 | DMH4 | 0441 | 0 | | | | | | | | | |
| JAKARTA (SGI-1B) GA | 062 | DMH4 | 1366 | 2 | | | | | | | | | |
| THAILAND | 066 | WRG7 | | | 12 | | | | | | | | |
| JAPAN/KDD TOKYO/C | 081 | DMH4 | 1353 | | | | | INT_CONG | 88 | 30/30 | | | |
| OYAMA/B (OYA/OB) KD | 081 | POT3 | 1203 | | | | C7 | | | 119/119 | | | |
| KOREA TELECOM-PUS | 082 | POT3 | 1245 | | | | C7 | | | | | | |
| KOREA SEOUL AXE | 082 | POT3 | 1270 | | | | C7 | | | 119/119 | | | |
| KOREA/DACOM (TAEJON | 082 | POT3 | 1270 | | | | | | | | | | |
| COMSAT SOUTHBURY E/ | 087 | WRG7 | 1373 | | | | | | | | | | |
| INDIA | 091 | SAJ4 | | | 0 | | | | | 13/30 | | | |
| INDIA NEW DELHI | 091 | POT3 | 1239 | 0 | | | | | | | | | |

STATUS: SORTING BY COUNTRY CODE.

Session Display Behavior Sort Maps                                    Help

INTERNATIONAL COMMUNITY INFORMATION SYSTEM (ICIS) EVENT MONITOR
CURRENT NETWORK STATE: 95/12/11 22:51:08 GMT
LAST EVENT TIME: 95/03/03 21:45:40

| CCODE | DESTINATION | SWITCH | ROUTE | ROUTE % ASR. | DEST % ASR. | DEST % OVFL. | SIGNAL FAIL | CKTS BLOCK/TOTAL | MODSECT | SYS | TYPE |
|---|---|---|---|---|---|---|---|---|---|---|---|
| 0031 | ROTTERDAM-2 NETHERLANDS | POT3 | 0500 | | | | | 16/119 | CMH-HHL | B | DRAD |
| 0032 | BRUSSELS-F BELGIUM | POT3 | 0401 | | | | | 30/59 | | | |
| 0032 | BRUSSELS-F BELGIUM | POT3 | 0405 | | | | | 14/30 | | | |
| 0032 | BRUSSELS-G BELGIUM | POT3 | 0503 | | | | C7 | 5/15 | LAU-PUL | A | FIBER |
| 0032 | BRUSSELS-G BELGIUM | POT3 | 0719 | | | | C7 | 4/30 | LAU-PUL | A | FIBER |
| 0034 | SPAIN BARCELONA 2 (DIGITAL | POT3 | 0460 | | | | C7 | 82/90 | BOS-CHT | E | DRAD |
| 0039 | ROME 1240 ITALY | SAJ4 | 0514 | | | | | 15/30 | | | |
| 0041 | SWITZERLAND ZURICH (ZH2) | POT3 | 0481 | | | | | 30/90 | BOS-CHT | E | DRAD |
| 0044 | UNITED KINGDOM KELVIN | POT3 | 0452 | | | | C7 | 47/60 | BOS-CHT | E | DRAD |
| 0044 | UNITED KINGDOM KELVIN | POT3 | 0453 | | | | C7 | 60/60 | BOS-CHT | E | DRAD |
| 0044 | UNITED KINGDOM KEYBRIDGE | SAJ4 | 1330 | | | | | 15/75 | BOS-CHT | E | DRAD |
| 0044 | UNITED KINGDOM MAULEYIA | WRG7 | 0470 | | | | | 5/30 | CMH-HHL | B | DRAD |
| 0049 | MUNICH/VAE GERMANY | WRG7 | 0537 | | | | | 30/30 | LAU-PUL | A | FIBER |
| 0054 | ARGENTINA CIBA-2 | WRG7 | 1275 | 2 | | | | 18/60 | GVE-WMD | B | DRAD |
| 0081 | JAPAN KDD TOKYO/A | POT3 | 1220 | | | | | | | | |
| 0081 | JAPAN/IDC OSAKA (DSK) | POT3 | 0413 | | | 74 | | 26/29 | | | |
| 0213 | ALGERIA ALGIERS | WRG7 | 0353 | | | | | 4/18 | MGN-WIN | J | DRAD |
| 0220 | BANJUL, GAMBIA | WRG7 | 0471 | 0 | | | | 14/30 | GVE-WMD | A | DRAD |
| 0221 | DAKAR, SENEGAL | WRG7 | 1345 | | | | | 6/10 | | | |
| 0221 | DAKAR, SENEGAL | WRG7 | 1346 | | | | | 1/4 | | | |
| 0221 | DAKAR, SENEGAL | WRG7 | 1347 | | | | | 3/3 | | | |
| 0223 | BAMAKO, MALI | WRG7 | 0429 | 1 | | 25 | | 6/10 | MGN-WIN | K | DRAD |
| 0234 | KADUNA, NIGERIA | WRG7 | 1383 | | | | | | GVE-WMD | A | DRAD |
| 0254 | NAIROBI, KENYA | WRG7 | 1277 | | | | | 4/18 | MGN-WIN | J | DRAD |

STATUS: SORTING BY COUNTRY CODE, PUDATE PERFORMED

| Class Name | Switch |
|---|---|
| Description | Stored program machine (i.e. computer) which determines the routing of and connects calls. |
| Subclass of | Equipment |
| Attributes | vendor |
| | model number |
| | node identifier |
| | class |
| | operational state |
| Operations | get operational state |
| | set operational state |
| Relationships | Trunk Group |
| | Port |
| | Serving Area |
| | Signaling Point |

FIG. 10

| Class Name | Customer |
|---|---|
| Description | An entity (individual, organization, business, etc.) which utilizes services. |
| Superclass of | Residential |
| | General Business |
| | National Account |
| | Reseller |
| Attributes | name |
| | customer id |
| | account number |
| | location |
| | account team contact |
| Operations | get customer profile |
| | set customer profile |
| Relationships | Service |
| | Organization |
| | Country |

| Class Name | Country |
|---|---|
| Description | A nation or state distinguishable by features of geography or culture |
| Subclass of | World Region |
| Attributes | coordinates |
| | holidays |
| | time zones |
| | languages |
| | political state |
| Operations | get political state |
| | set political state |
| Relationships | superCountry Region |
| | subCountry Region |
| | Customer |
| | Metrics |

FIG. 11

| Class Name | 800 Service |
|---|---|
| Description | Telephone service in which called party is the billable customer |
| Subclass of | Service |
| Attributes | inbound translation |
| | inbound trunk |
| | ddd translation |
| | ani delivery |
| Operations | get ddd translation |
| | set ddd translation |
| Relationships | Service Control Point |
| | 800 Service Metrics |

FIG. 12

SYSTEM AND METHOD FOR MANAGING A TELECOMMUNICATIONS NETWORK BY ASSOCIATING AND CORRELATING NETWORK EVENTS

BACKGROUND OF THE INVENTION

1. Field of the Invention

The present invention relates generally to telecommunications network management. More particularly, the present inventions relates to a system and method for state-management of network elements that incorporates the impact of network events from different domains of the network.

2. Related Art

Commercial telecommunications networks must function properly in any environment or condition to successfully deliver customer traffic. However, due to their wide geographical coverage and technically complex nature, telecommunications networks are vulnerable to frequent traffic-impacting problems.

Telecommunications network management personnel must monitor several sources of network data. These data represent various network events, such as fiber cuts, switch outages, and call blockage. Often, several different data from different sources may be generated as a result of the same, single event. It is difficult for network management personnel to piece together these disparate data and arrive at a conclusion regarding the cause of such events. It is also difficult for them to analyze these disparate data to determine the current state of the network.

Accordingly, telecommunications networks require sophisticated network management systems to provide visibility to the condition of the entire network and any problems that occur, such as fiber cuts and switch outages. These systems must also enable network management personnel to quickly analyze the problem and determine the optimal solution for restoring traffic. In order to meet these objectives, a telecommunications network management system must perform several functions. Such a system would monitor network events, associate related events with each other, infer possible root causes of events, determine impact of events in terms of customer traffic, present the current state of the network, and recommend appropriate actions.

However, conventional telecommunications network management systems do not meet these objectives. Conventional telecommunications network management systems monitor alarms and report when an alarm is triggered. Such alarms may indicate that noise levels or blocked calls have exceeded a preset threshold, or that a communications link has been broken. Network management personnel must then correlate these disparate alarms and infer the source of the problem, such as a fiber cut or switch outage. Network management personnel must then determine a solution from their inference, and take appropriate action.

These conventional telecommunications network management systems have many shortcomings since they do little more than report events. They do not present the current state of the network or how that state has recently changed. Conventional telecommunications network management systems represent the network only as a collection of physical elements, such as switches and multiplexing equipment.

Conventional telecommunications network management systems are also subject to systemic errors that may produce anomalous results. This is due to the fact that actions of conventional systems are based on receipt of a sequence of alarms. For example, if an alarm A is triggered by a transmission failure, and the resulting blocked calls on a switch triggers an alarm B, a conventional network management system may receive alarm B prior to receiving alarm A. In fact, numerous related alarms may be received in any order. This fact makes it difficult for a conventional system to determine if all related alarms have been received, and to then correlate related events.

Another drawback of conventional network management systems is that they receive event information from several different sources, and then present this information in the same detached and unrelated manner. This requires the network manager to compose the proper scenario by manually correlating information from the different sources.

Since conventional systems are limited to reporting events, they require the network manager to manually correlate reported events and to infer possible root problems. This requires a high level of expertise and experience on the part of the network manager. It also requires extra time for a network manager to perform these functions.

Conventional network management systems do not provide correlation that spans multiple domains (i.e., transmission, switching, traffic). As such, they are extremely limited in their ability to recommend corrective actions. Most actions needed to resolve a network problem must therefore be suggested by the network manager.

There is thus a need for a telecommunications network management system that provides network management personnel with an integrated view of the current state of the network, that correlates related network events, and that recommends corrective action.

SUMMARY OF THE INVENTION

The present invention is a system and method for managing telecommunications networks. The present invention manages the state of network elements by associating and correlating network events across many different network domains. The network elements include not only network hardware and equipment, but also non-tangible elements such as customers, countries, and services. In addition to correlating network events, the present invention infers sources of problems, assesses impacts of network events, and provides recommendations based on network state changes.

In one aspect of the invention, a method for managing a telecommunications network is provided. In this method, a network object database is maintained. The network object database is made up of network objects, each corresponding to a network element. Each network object is defined by a set of attributes. The value of each attribute represents the current state of the corresponding network element. When network information (network event information or network topology information) is received, network objects impacted by the information are identified as impacted network objects. The impacted attributes are also identified. The impacted network objects correspond to network elements impacted by the network information. The values of the impacted attributes are changed in a network object database to reflect the impact of the network information. In this manner, the current state of the impacted network elements is updated with a state change. The current and updated state of the network elements is provided to a network management workstation.

The network object database may be maintained by maintaining: a network topology object database that contains the network objects; a call data object database that contains call data objects that correspond to data contained in call data records; and a traffic metric objects database that contains network traffic objects that correspond to network traffic data. The network objects in the network topology object database may include network hardware objects that correspond to hardware elements of the network, and network route objects that correspond to network routes.

In a further aspect of the invention, the method includes determining whether a state change is a significant state change. For each significant state change, an expert system rule may be applied to produce an assessment of the significant state change.

In yet a further aspect of the invention, a system for managing a telecommunications network is provided. The system includes a network management workstation for displaying a network state. The system also includes a network information receiving and processing means communicating with the workstation for receiving and processing information affecting the network state. The network information receiving and processing means provides apparatus for implementation of the methods of the present invention.

FEATURES AND ADVANTAGES

One feature of the present invention is that it provides the current state of the network, as well as historical (recent but past) states.

A further feature of the present invention is that the network is represented as consisting of customers, countries, services, and other non-tangible network elements, in addition to the physical or hardware elements such as switches and multiplexing equipment. This feature enables the present invention to determine customer and service impacts, as well as impacts to network hardware.

It is yet a further feature of the present invention that an inferencing engine is provided to correlate events, to infer possible causes of such events, and to recommend actions to be taken in response to such events.

An advantage of the present invention is that, by managing the state of the network, it associates and correlates network events across different network domains. Such domains include, but are not limited to, transmission, switching, customer traffic, and network routing.

A further advantage of the present invention is that improved temporal reasoning is realized by presenting the state of the network with every event. Instead of attempting to correlate sequential events after they have been non-sequentially reported, the present invention correlates state changes of network elements based on programmed heuristics. This eliminates the need to properly sequence alarms and events.

Another advantage of the present invention is that information from various sources is presented in a manner that provides an integrated view of the current state of the entire network. For example, all information regarding any element that is part of a particular network route is presented as a single row in a table.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 6 shows a screen print of a network management workstation display. The screen print contains a sample data table that shows the present state of a network, including correlated recent events;

FIG. 7 shows another screen print of a network management workstation display that has been sorted by country code;

FIG. 9 shows a table defining a switch object class;

FIG. 10 shows a table defining a customer object class;

FIG. 11 shows a table defining a country object class;

FIG. 12 shows a table defining an 800 service object class; and

DETAILED DESCRIPTION OF THE EMBODIMENTS

1. Overview

Figure 1:
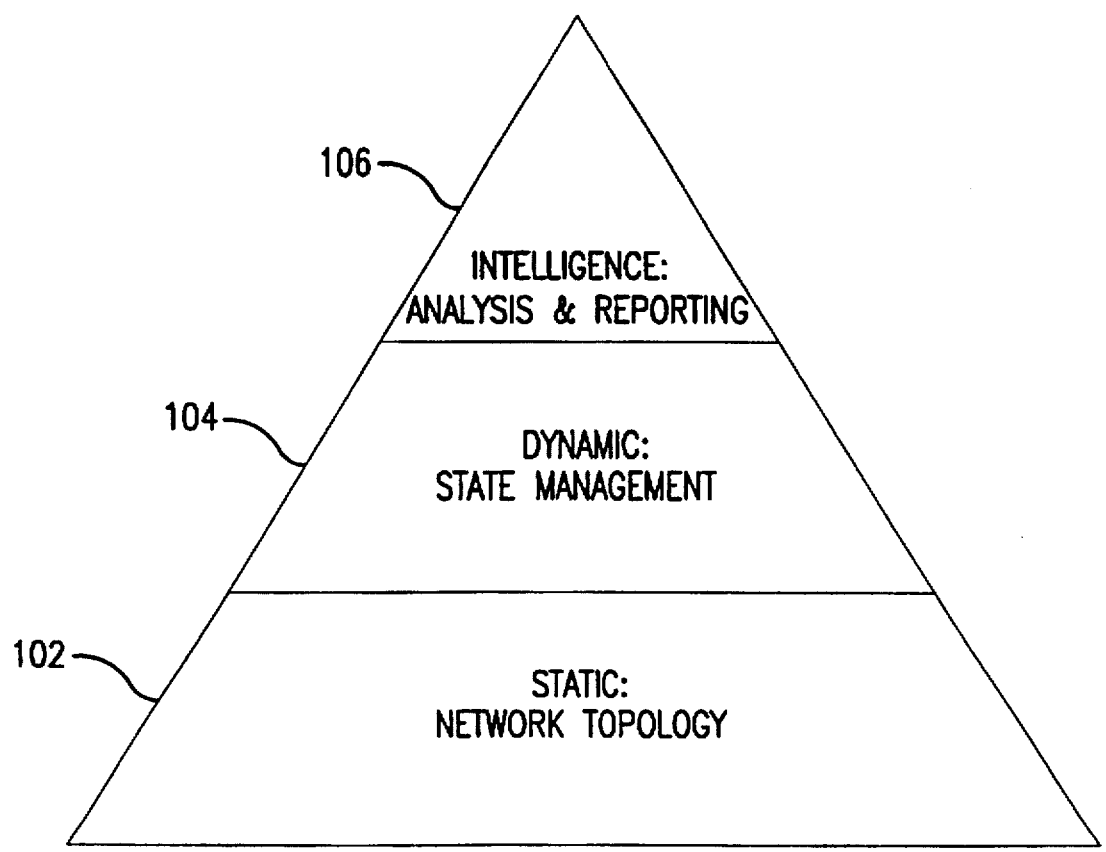
FIG. 1 shows a block diagram that illustrates the three-tiered network management hierarchy implemented by the system and method of the present invention.

The present invention is a system and method for managing telecommunications networks, particularly circuit-switched networks. The present invention provides enhanced inferencing and correlation functions not found in conventional systems. In contrast to the "event" management of conventional network management systems, the present invention manages the "state" of the network. As used herein, "state" refers to a set of circumstances or attributes characterizing a network element (or its corresponding object) at a given time, i.e., the condition of the network element. A network element's state can be a simple, boolean value (e.g., in-service or out-of-service), or it can be more complex (e.g., in-service, but service is degraded). State can be current (e.g., a trunk group's Answer/Seizure Ratio for the last five minute reporting period) or historical (e.g., a list of key traffic measurements for that trunk group for the last 24 hours). Expert system rules that correlate events, infer sources of problems, assess impacts, and provide recommendations are triggered by network state changes.

The present invention performs these functions by implementing a three-tiered network management hierarchy. The bottom tier is static and represents a model of the network. It provides updated network topology information. The middle tier is dynamic and represents state management of the modeled network. It provides visibility to the current conditions of the network that is modeled in the bottom tier. The top tier consists of enhanced functions and intelligence. It provides analysis, reporting, inference, presentation, and recommendations for actions.

In a first and preferred embodiment, the inferencing and correlation capabilities are performed by an expert system. The expert system performs this function by applying rules, and graphically presents the results in a number of ways, e.g., changing color of a route on a map or illustrating a line or bar graph. In an alternate embodiment, expert system rules are not applied. Rather, a sweep of a network object database is performed at regular intervals. This sweep identifies: (1) significant state changes of network element objects; (2) potentially impacted network elements using predefined relationships among the objects in the network object database; and (3) impacts to the related objects. The impacts to the network elements are reported as a table of correlations.

State management is realized by modeling each network element as an object within an object database. A network object corresponds to a network element. As used herein, a "network element" includes, but is not limited to, non-tangible elements, such as customers, countries, and services, and tangible elements such as network hardware elements (e.g., switches and multiplexing equipment). As event information is received by the system of the present invention, appropriate attributes of impacted objects are changed to reflect the change of state of that object. The current state of the network is then presented to the user on regular intervals, as significant state changes occur, or on user demand. Impacts of these events, such as customer outages or blocked traffic routes, can also be determined and presented. The system of the present invention also has the ability to present impacts of network controls and corrective actions immediately after they are implemented.

The present invention allows network management personnel to monitor and analyze various data collected from several different sources of the network that is presented in a simple, integrated fashion. It provides automated functions that were previously done manually, such as correlating network events and inferring possible causes of such events. The present invention achieves these results by presenting the state of the network, and how that state changes with events, rather than just reporting the occurrence of the events.

2. System Description

With reference to FIG. 1, a block diagram is shown that illustrates the three-tiered network management hierarchy implemented by the system and method of the present invention. The bottom fundamental tier is a static network topology tier 102 that contains a model of the entire network. Tier 102 provides static information regarding the topology and design of the network. Although this information is static in relation to network events, it is updated regularly as the topology of the network changes.

A middle dynamic state management tier 104 is built over network topology tier 102. State management tier 104 consists of dynamic information relating to events that occur in or impact the network. The present invention reflects changes in state of various elements of the network through state management tier 104. State management tier 104 also provides visibility to the current state of the entire network. The implementation of state management tier 104 marks a significant difference from the event management of conventional network management systems.

A top intelligence, analysis, and reporting tier 106 is built over the middle state management tier 104. Tier 106 provides analysis and reporting based on changes in the state of the network. Analysis consists of such enhanced functions as event correlation and inference of the cause of events.

Figure 2:
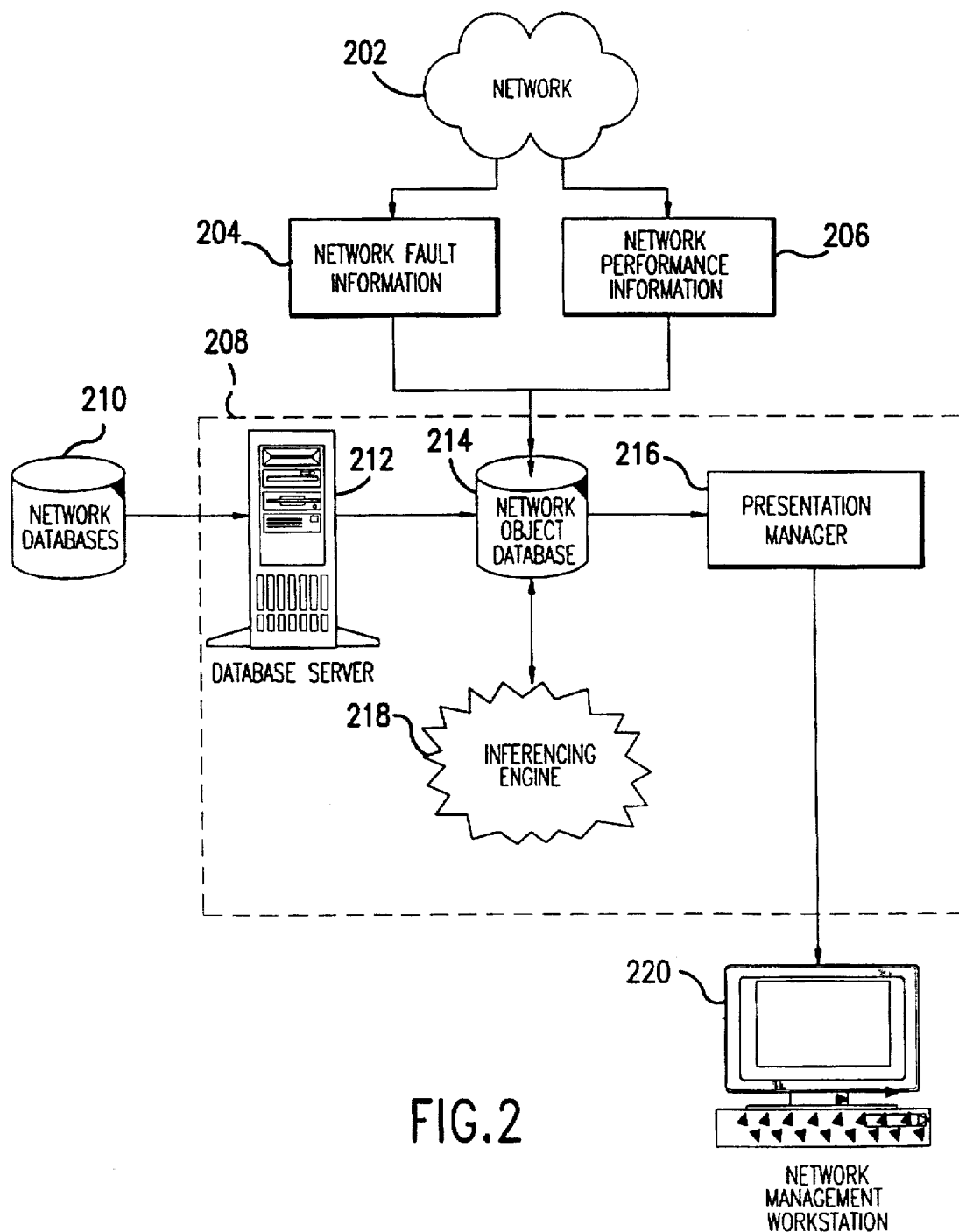
FIG. 2 shows a high-level block diagram illustrating the system architecture of the present invention.

Turning now to FIG. 2, a high-level block diagram is shown that illustrates the architecture of the present invention. The components of a system architecture 208 are encompassed by the broken line. A network to be managed by the system and method of the present invention is shown generally as element 202. Network Fault Information 204 and Network Performance Information 206 are collected from Network 202 by conventional mechanisms apparent to one of skill in the relevant art. Network Fault Information 204 refers to alarms, outages, and other problems. Network Performance Information 206 refers to traffic loads, call data, exceeded thresholds, and other data reflecting the performance of Network 202.

Network Fault Information 204 and Network Performance Information 206 are fed to a Network Object Database 214 that is part of system architecture 208. Network Object Database 214 is built from objects rather than records. Each object corresponds to or represents a network element, such as a switch, customer, country or service.

Figure 8:
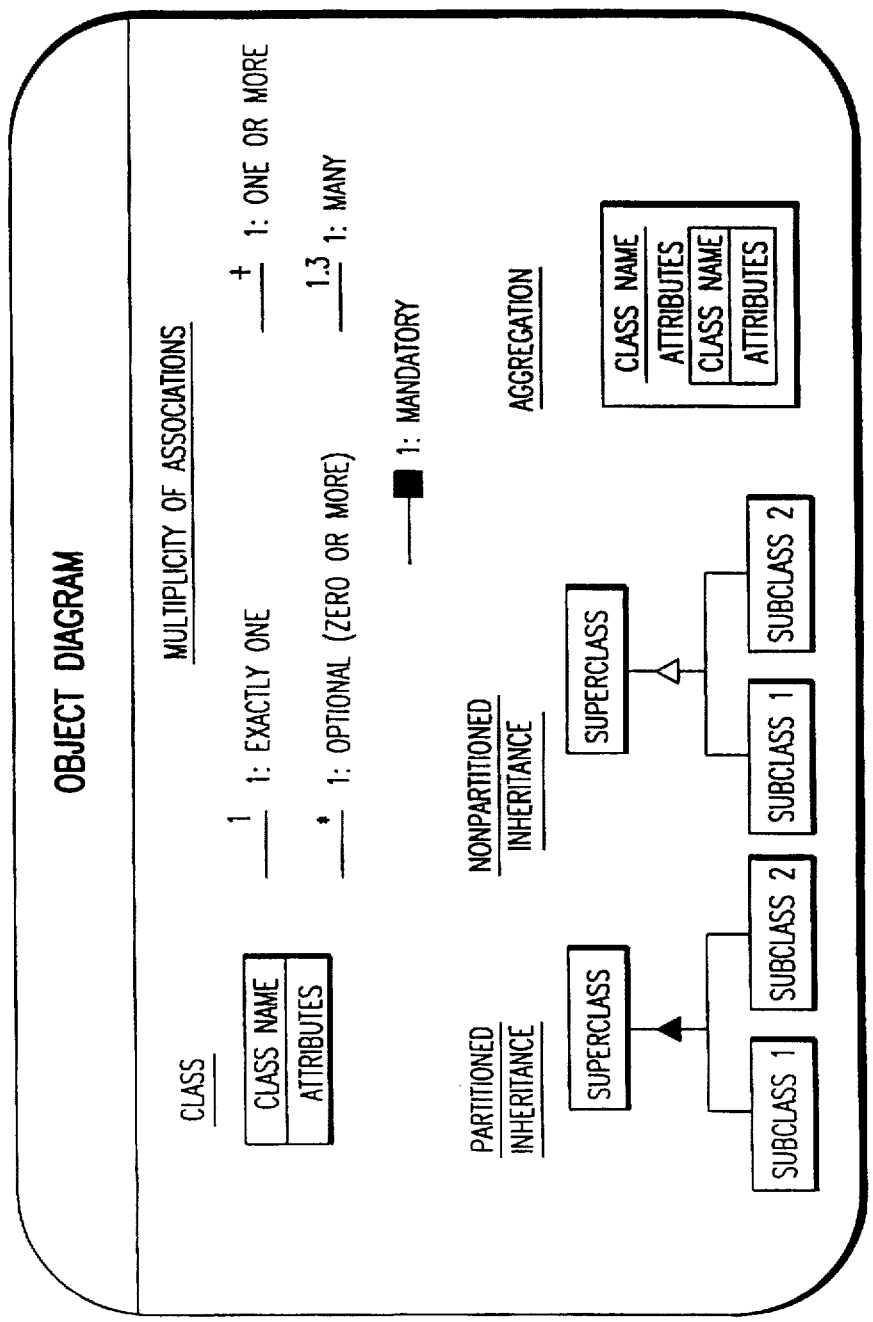
FIG. 8 shows an Object Diagram generally depicting objects for an object database suitable for use in the present invention.

FIG. 8 shows an Object Diagram from a Computer Aided Systems Engineering tool (Paradigm Plus, Protosoft) that generally depicts objects for an object database suitable for use in the present invention. A preferred object database that may be used is a Versant object database. One example of a specific object definition is shown in FIG. 9. FIG. 9 shows a table defining a class of objects entitled "switch." A switch object is a network hardware object that corresponds to a hardware element of the network, particularly a stored program machine, such as a computer, that connects and determines the routing of calls. FIG. 9 shows how switch objects relate to other network elements and their corresponding objects. As shown in FIG. 9, the switch class is a subclass of "Equipment." The definition also includes a set of attributes (e.g., "vendor" or "model number"). The behavior component of this object class is identified by the operations ("set" and "get"). The relationships with other objects are also identified (e.g., "Trunk Group" and "Port").

As another example, FIG. 10 shows a table defining a class of objects entitled "customer." A customer object corresponds to a non-tangible network element, particularly an entity that uses services. As shown in FIG. 10, the customer class is a superclass of other classes (e.g., "Residential" or "General Business"). FIG. 10 illustrates the relationship and attribute definition for customer objects. For example, a customer object has "name" and "customer id" attributes. A customer object relates to "Service", "Organization", and "Country" objects. A "Country" class of objects is defined in the table shown in FIG. 11. FIG. 11 shows the relationship to customer objects.

An example of a service class of objects is shown in FIG. 12. FIG. 12 shows a table defining a class of objects entitled "800 Service" in which the called party is the billable customer. The 800 Service class is a subclass of "Service" that relates to "Customer" objects. FIG. 12 illustrates the relationship and attribute definition for 800 Service objects.

Each object is defined by a set of attributes, the values of which reflect the current state of the corresponding network element. As event information is received from Network 202, network elements that are impacted by the event (impacted network elements) are identified by their corresponding object as impacted network objects. Appropriate attributes of each object are identified as impacted attributes. The values of impacted attributes are then changed to reflect the impact of the event. The changed attributes then represent the updated current state of that object. This process of identifying impacted network objects and changing the values of impacted attributes is represented in dynamic state management tier 104 shown in FIG. 1.

Referring again to FIG. 2, Network Object Database 214 is populated with input from a Network Database, shown generally at 210. This database is a conventional source of data that an enterprise uses to build its network. Network database 210 contains data that represent the current topology, structure, routing, and capacity of the network. These data are fed to Network Object Database 214 via a Database Server 212. A preferred database server for use with the present invention is a Sybase OMNI SQL Server. The data are processed to represent each element as an object, which is then entered into Network Object Database 214. Data is periodically provided to Network Object Database 214 to maintain a current view of network topology. This process of updating network objects to maintain a current view of network topology and architecture is represented in static network topology tier 102 shown in FIG. 1.

An Inferencing Engine 218 communicates with Network Object Database 214 to provide intelligence capabilities. A particularly preferred Inferencing Engine 218 is Talarian's RTWorks Expert System. Inferencing Engine 218 is programmed with rules and heuristics that are used to induce and deduce results of events that are input to Network Object Database 214. This provides the inferencing and correlation capabilities of the present invention. As impacted attributes are changed in response to events, a change in state to corresponding elements is registered. If such a state change is deemed significant, a notification message is issued to Inferencing Engine 218. This notification message triggers rules in Inferencing Engine 218 that are applied to perform enhanced functions. These functions include event correlation, impact assessments, problem inference, and action recommendation. These intelligence functions are represented in intelligence, analysis, and reporting tier 106 shown in FIG. 1.

Processed data, reflecting recent (historical) and current states of network elements, are collected by a Presentation Manager 216. These data are formatted into tables, graphs, or maps that show the correlation of events. The data are transmitted to a Network Management Workstation 220 for presentation and display. Network management personnel who use workstation 220 can then view current and previous states of the entire network.

Figure 3:
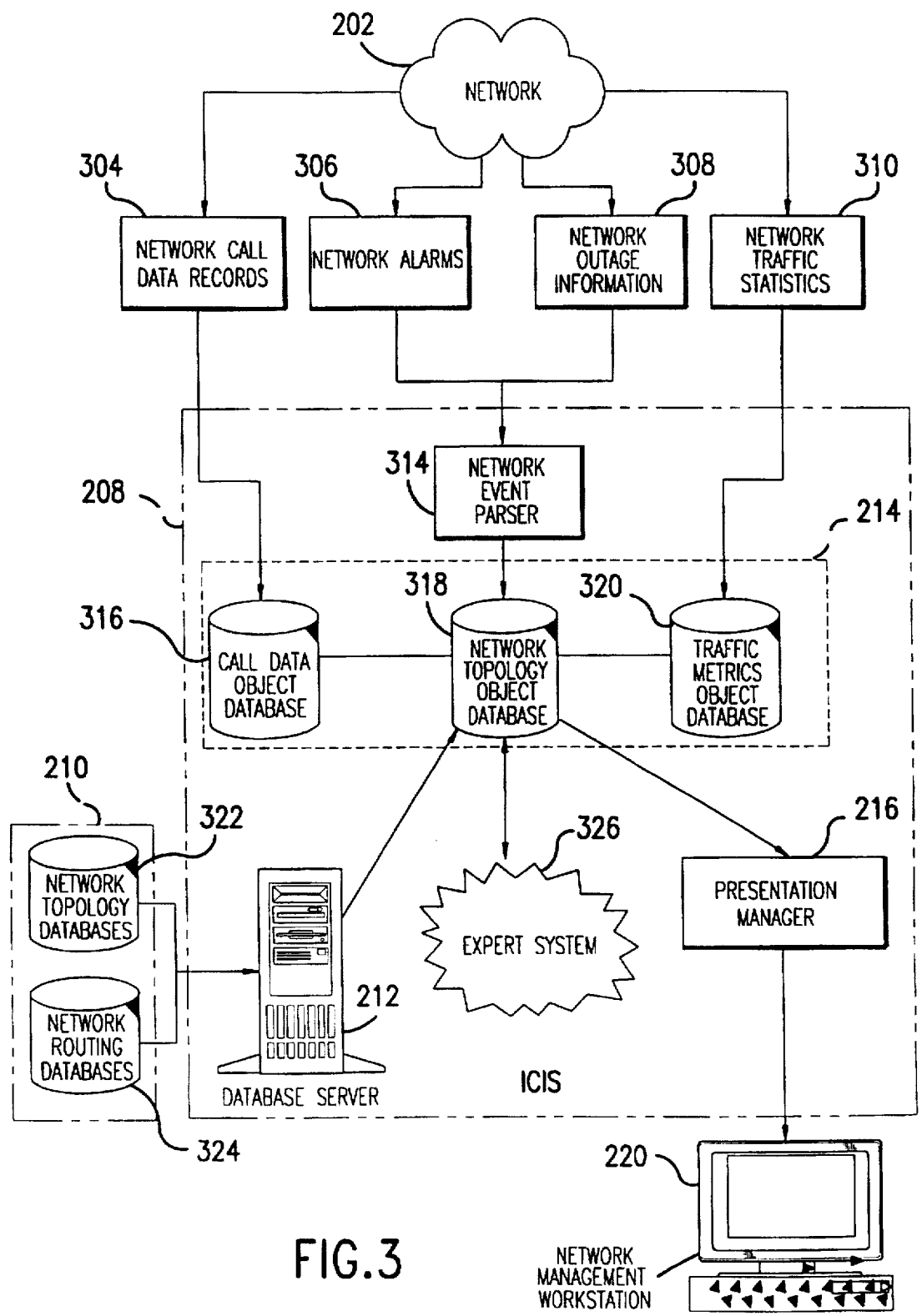
FIG. 3 shows a more detailed block diagram of the system architecture of FIG. 2.

FIG. 3 shows a more detailed block diagram of the system architecture of FIG. 2. Network Object Database 214 shown in FIG. 2 is comprised of three object databases. The three object databases shown in FIG. 2 for Network Object Database 214 are illustrative, and the present invention is not limited to use of such databases for Network Object Database 214. It is to be understood that Network Object Database 214 could contain any number of other object databases. The first is a Network Topology Object Database 318 that contains objects that represent network elements. The attributes of each object represent the present state of the network element corresponding to that object. These attributes are changed by events that are received by Network Object Database 214. As shown in FIG. 3, such events include Network Alarms 306 and Network Outage Information 308. This information is collected from Network 202 and input to a Network Event Parser 314.

Network Event Parser 314 serves as a gateway for event data. Network Event Parser 314 parses and formats the data to be uploaded to Network Topology Object Database 318. This ensures that objects that are impacted by a certain event are adequately identified, and that the appropriate attributes of each impacted object are properly updated.

Figure 3A:
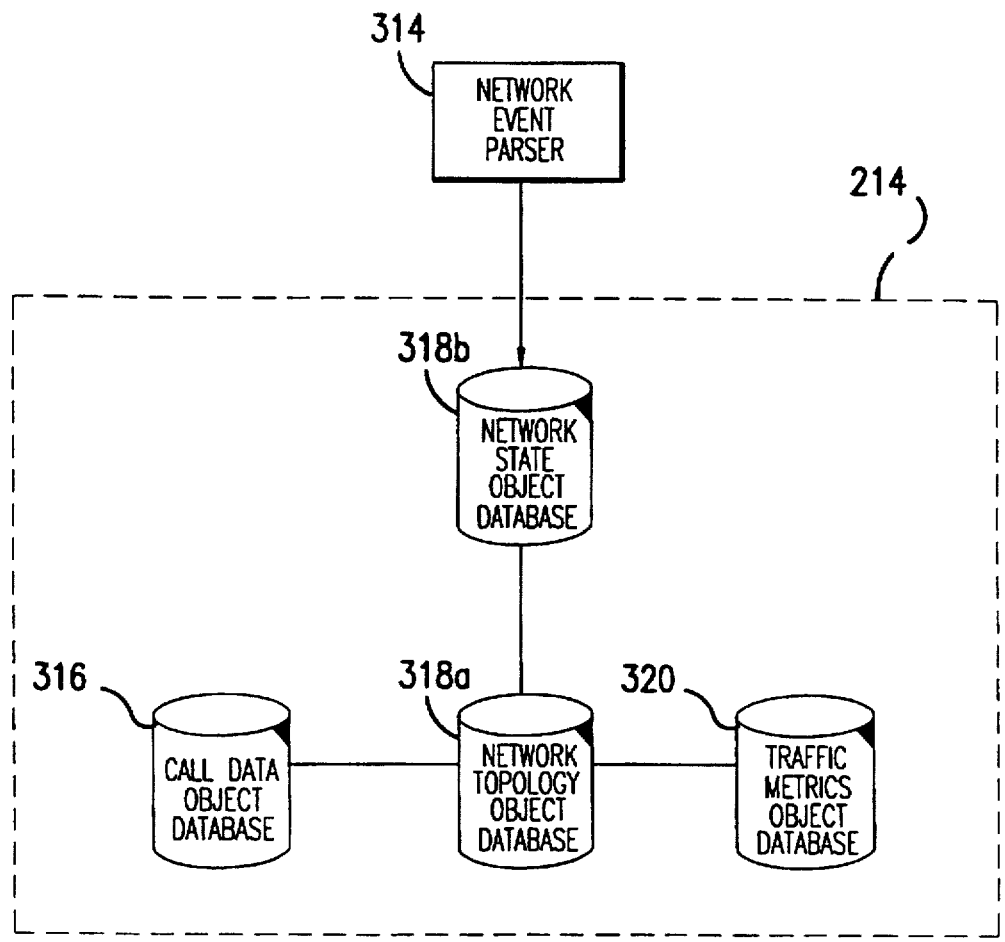
FIG. 3a shows an alternative embodiment for a Network Topology Object Database of the present invention.

As an alternative embodiment, Network Topology Object Database 318 may be partitioned into two databases, as shown in FIG. 3a. A Network Topology Object Database 318a contains objects and object relationships identifying each network element and its relationship to other elements. A Network State Object Database 318b contains Network State Objects representing the dynamic state of each network element. Each network element object in Network Topology Object Database 318a is linked to a network state object in Network State Object Database 318b, which provides the current state of that network element. Each network state object is defined by a set of network state attributes that represent the dynamic state of the corresponding network object. As an example, an object representing network element Trunk Group 1234 is contained in Network Topology Object Database 318a. Attributes of this object may include switch/port #1 identifier, switch/port #2 identifier, number of circuits, and type of service supported by the Trunk Group. Also contained within this object is a pointer to a state object contained within Network State Object Database 318b. This state object may include an attribute whose value indicates Trunk Group 1234 is currently experiencing complete blockage on 75% of its circuits.

The second object database that makes up Network Object Database 214 is a Call Data Object Database 316. Call Data Object Database 316 collects Network Call Data Records 304 from Network 202 and converts them into call data objects. Call Data Records are also referred to as Call Detail Records (CDR). CDR data, such as originating ANIs (Automatic Number Identifiers) and service types, builds and modifies call data summary objects in Call Data Object Database 316. These call data summary objects are linked to network element objects in Network Topology Object Database 318 via pre-defined relationships. These relationships provide an association between network elements and CDR-based performance data that pertain to the associated network elements.

The third object database that makes up Network Object Database 214 is a Traffic Metrics Object Database 320. Traffic Metrics Object Database 320 collects Network Traffic Statistics 310 that originate on Network 202 and converts them into network traffic objects. These statistics represent customer traffic loads on each trunk and switch in the network. They reflect the performance of the network, and include such data as call attempts, call completions, call blocking percentages, trunk utilization and switch utilization. Network traffic objects are related to network element objects in Network Topology Object Database 318. These relationships provide an association between network elements and network traffic statistics to reflect the impact of network traffic on the associated network elements.

Network Database 210 is partitioned into a Network Topology Database 322 and a Network Routing Database 324. Network Topology Database 322 contains data that specify the structure, topology, architecture, and capacity of Network 202. Network Routing Database 324 contains data that specify logical routes and paths of traffic, as well as connections to various destinations. The data of Network Topology Database 322 and Network Routing Database 324 are periodically input to Network Topology Object Database 318 via Database Server 212. For example, as changes to the design of Network 202 are implemented, the data in Network Topology Database 322 and Network Routing Database 324 are changed to reflect the new design. These data are then fed via Database Server 212 to Network Topology Object Database 318. Network Topology Object Database 318 updates impacted attributes of objects impacted by the design change. This maintains a current view of network topology.

One example of Inferencing Engine 218 is an Expert System 326. Expert System 326 interfaces with Network Topology Object Database 318 to provide the functions that constitute intelligence tier 106. Expert System 326 reads state changes from Network Topology Object Database 318. Based on these state changes, Expert System 326 applies appropriate rules that correlate various events and infer possible root causes of events to produce an assessment of the events. The assessment, containing the results of such correlation and inference, is provided to Presentation Manager 216 to format for presentation. Expert System 326 can also provide a recommendation on corrective action or network controls to Network Topology Object Database 318, and can then monitor the impact of such controls to determine when to remove them. The impact of such recommended corrective actions are applied to impacted objects. The resulting state changes are then provided to Presentation Manager 216 to format for presentation.

As an alternative to using Expert System 326, correlation may be performed by auditing Network Topology Object Database 318, or Network State Object Database 318b if that embodiment is used, at periodic intervals. This audit is performed to identify significant changes in the state of network element objects. If such a significant state change is identified, all related network elements are then identified via pre-defined network element object relationships. These relationships are defined and maintained in Network Topology Object Database 318, and are based on actual network topology. Impacts to states of the related network elements are then assessed, and changes in states of all related network elements are correlated and reported to the user via a table of correlations.

Presentation Manager 216 receives data from Expert System 326 and from each of databases 316, 318, and 320. These data represent updated states of Network 202, network events, network performance, correlation of events, inferred causes of events, impacts of events, and recommended actions. Presentation Manager 216 formats these data into tables, graphs, or maps so that they are presented to a user, such as network management personnel, in a clear and useful manner. Presentation Manager 216 provides the formatted data to Network Management Workstation 220, for viewing by network management personnel. For example, assume a DS-3 outage event occurs, and several alarms are received that are correlated to that DS-3 outage event. This network event information is received and processed, and the data formatted so that the DS-3 outage event, all correlated events, and all impacted network elements are presented as correlated. This presentation may be as a table with correlated events appearing on a single row, as a bar or line graph representing the impacts of correlated events, as a route map showing correlated events in specific colors or patterns, or other methods apparent to those skilled in the relevant arts. This allows the user to see all reported and filtered events related to the DS-3 outage event. This assists network management personnel in determining the appropriate controls and corrective action.

An example of a screen print of a network management workstation display is shown in FIG. 6. In the embodiment shown in FIG. 6, Expert System 326 is not used. Rather, event correlation is performed by sweeping the network object database. The screen print contains a sample data table that shows the present state of a network, including correlated recent events. Each row in the table represents a route to a specific country and destination switch, which are identified in the first column. Other columns represent the country code (CCode) for that country, the originating switch that serves it, and a route number. The remainder of the row presents a series of statistics that reflect the current state of that route. In the embodiment of FIG. 6, these include:

| Element State | Element Modified by this State | Element State Description |
| --- | --- | --- |
| Route % ASR | Route or Trunk Group | The call attempt Answer/Seizure Ratio (ASR) of a particular route. |
| Destination % ASR | Switch-to-Country relationship or link | The ASR percentage to a country as reported by a particular switch. |
| Destination % OVFL | Switch-to-Country relationship or link | The traffic overflow percentage to a country as reported by a particular switch. |
| Signal Failure | Switch-to-Signal Point relationship or link | Loss of signaling capability to a remote switching center as reported by a particular switch. |
| B-Category EOS (End-of-Selection) | Route or Trunk Group | The category of failure for call attempts on a route which have failed during a recent time interval. |
| B-Cat % Failure | Route or Trunk Group | The percentage of call attempts on a route which have failed during a recent time interval. |
| Ckts Blocked/Total | Route or Trunk Group | The number of circuits blocked over the total number of circuits on that trunk group. |
| Transmission Out DS3 End Point | DS3 | Identifies particular DS3 for which impacts have been reported or assessed. |
| Transmission Out Break Point | DS3 | Identifies station pair on DS3 between which impacts have been reported or assessed. |
| Type | Transmission Segment | Identifies technology (e.g., fiber optic or digital radio) of transmission segment on which impacts have been reported or assessed. |

By placing all state data in a single row, the results of the correlation processing by the present invention is presented to the user. This enables network management personnel to formulate a clearer picture of what is happening in a particular portion of the network, including causes and impacts of events.

Another example of a screen print of a network management workstation display is shown in FIG. 7. In FIG. 7, information lines have been sorted by country code. For example, all information for the United Kingdom has been grouped together, even though the information was reported by more than one gateway. This feature assists network management personnel in identifying systematic network events that impact more than one gateway, such as a transoceanic cable outage.

In the alternative embodiment of the invention, in which Expert System 326 is not used, the display of network state information is refreshed every two minutes, "sweeping through" Network Topology Object Database 318. The state of any particular network element persists until it is cleared by a subsequent state change.

Figure 13:
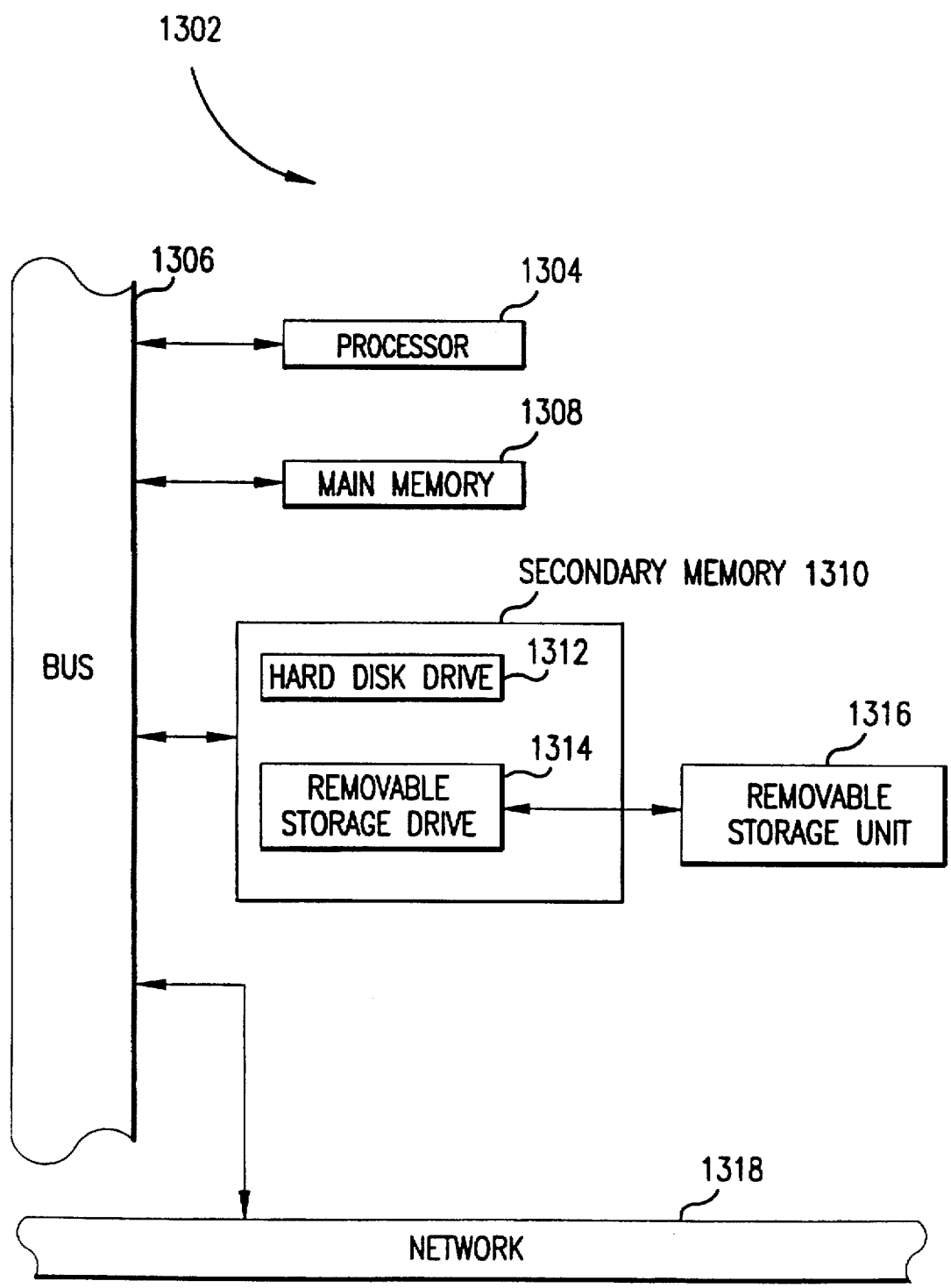
FIG. 13 shows an exemplary computer system for use in the network management system of the present invention.

An exemplary computer system 1302 for use in the network management system of the present invention is shown in FIG. 13. In a preferred embodiment computer system 1302 is an IBM RS/6000. Computer System 1302 implements System Architecture 208 by receiving and processing network information. Computer System 1302 provides data to Network Management Workstation 220. Computer System 1302 includes one or more processors, such as processor 1304. Processor 1304 is connected to a communication bus 1306. Computer System 1302 may communicate with other similarly configured computer systems or with Network Management Workstation 220 via a network 1318.

Computer system 1302 also includes a main memory 1308, preferably random access memory (RAM), and a secondary memory 1310. Secondary memory 1310 includes, for example, a hard disk drive 1312 and/or a removable storage drive 1314, representing a floppy disk drive, a magnetic tape drive, a compact disk drive, etc. Removable storage drive 1314 reads from and/or writes to a removable storage unit 1316 in a well known manner.

Removable storage unit 1316, also called a program storage device or a computer program product, represents a floppy disk, magnetic tape, compact disk, etc. As will be appreciated, removable storage unit 1316 includes a computer usable storage medium having stored therein computer software and/or data.

Computer programs (also called computer control logic) are stored in main memory and/or secondary memory 1310. Such computer programs, when executed, enable computer system 1302 to perform the features of the present invention as discussed herein. In particular, the computer programs, when executed, enable processor 1304 to perform the features of the present invention. Accordingly, such computer programs represent controllers of computer system 1302.

In an alternate embodiment, the invention is directed to a computer program product comprising a computer readable medium having control logic (computer software) stored therein. The control logic, when executed by processor 1304, causes processor 1304 to perform the functions of the invention as described herein.

When network event information (such as one of the alarms in Network Alarms 306) is received, the network event information is processed to answer three basic inquiries:

(1) what objects are impacted by this network event information;

(2) what attributes of each impacted object are impacted by this network event information; and (3) to what value should each impacted attribute be changed to reflect the impact of the network event information.

These same inquiries are made when network topology information is received from Network Database 210 regarding network topology and routing. The operation of the present invention is illustrated in the following examples.

3. Examples

Figure 4:
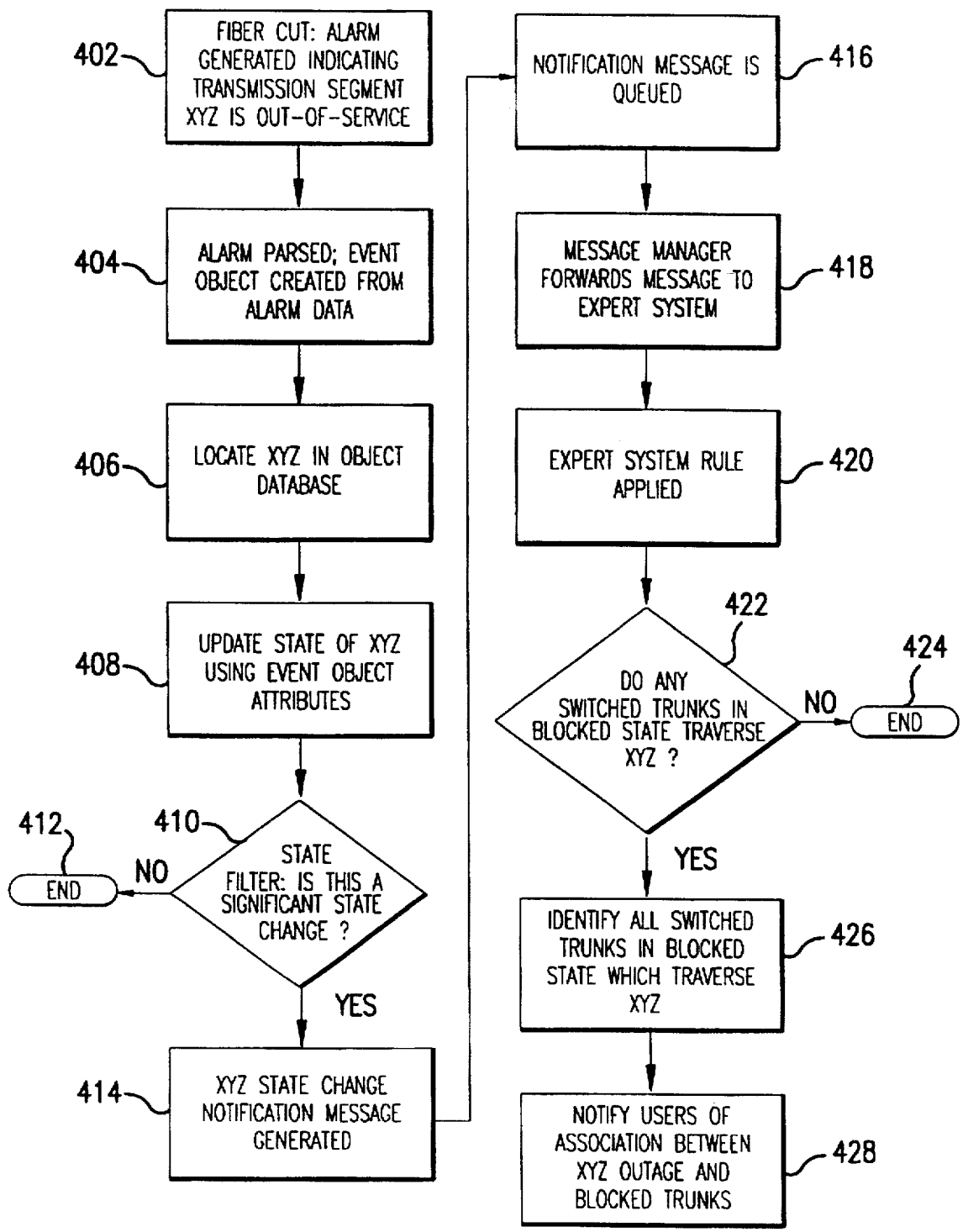
FIG. 4 shows a process flowchart illustrating the operation of the present invention, using an example of a typical fiber cut.

Referring to FIG. 4, a process flowchart is shown that illustrates how the present invention operates in response to a typical network event, a transmission fiber cut. A fiber cut generates an alarm from a network that indicates which transmission segment is out-of-service in a step 402. The alarm is generated and the associated data are provided via conventional network mechanisms. In this example, the impacted transmission segment is identified as XYZ, which may represent a segment of fiber between two optical repeaters or terminals.

When the alarm data are received, the data are parsed by Network Event Parser 314, and an object representing the event is created in a step 404. In a step 406, the network object representing transmission segment XYZ is located in Network Topology Object Database 318. The state of the segment XYZ is updated in a step 408. The event attributes of the event object created in step 404 are used to control the changes made to the impacted attributes of the XYZ object. By changing the value of the impacted attributes of the XYZ object, the state of the transmission segment XYZ is changed.

In a step 410, a state filter is used to determine if the state change of transmission segment XYZ is significant enough to report. This process eliminates reporting of several trivial events that may occur, such as a negligible increase in call blockage. The state filter of step 410 may be implemented through discrimination rules in Network Topology Object Database 318. Such discrimination rules are included in the object definition or registration. For example, in the definition of a network route object that corresponds to a network route, a rule can be written to notify if a route attribute changes. Alternatively, a discrimination rule can be written to notify only if the route attribute changes in a particular way, i.e., a significant state change. Alternatively, the state filter of step 410 may be implemented through rules contained in Inferencing Engine 218, or Expert System 326.

If the state filter determines the state change is not significant, the process ends as indicated in a step 412, and the state change does not get reported or assessed. If the state filter determines the state change is significant, the process proceeds to a step 414, in which a notification message of the XYZ state change is generated. This message defines how the state of XYZ was changed so that the impact can be determined. In a step 416, the state change notification message is queued. A message manager reads the notification message from the queue, and forwards it to Expert System 326 in a step 418.

In a step 420, Expert System 326 reads the notification message and applies the appropriate rules to assess the impact of the state change, as well as to associate or correlate this state change with other state changes. These rules, as applied by Expert System 326, are based on programmed heuristics that define how network entities are related, how they are impacted by various events, and how they behave. In this particular example, Expert System 326 applies or carries out the rules identified in steps 422–428. Expert System 326 examines the links in Network Topology Object Database 318 between transmission segment XYZ and each of the switched trunks to determine which switched trunks traverse segment XYZ. Expert System 326 also queries the state of each switched trunk to determine if any of them are in a blocked state. This determination is made in a step 422 to identify switched trunks that may be blocked as a result of the fiber cut in transmission segment XYZ.

If no switched trunks in a blocked state are found to traverse segment XYZ, the process ends as indicated in a step 424. However, if such trunks are found, they are identified in a step 426, i.e., identify all switched trunks in a blocked state that traverse segment XYZ. These data are presented via Presentation Manager 216 to notify the users of the determined correlation between the XYZ segment outage and the blocked trunks, as indicated in a step 428.

The process of FIG. 4 illustrates how the present invention correlates network events. In step 420, the state of each switched trunk in Network Topology Object Database 318 is queried to determine which trunks are being blocked. This query is necessary to correlate the XYZ transmission segment outage to blocked trunks.

Figure 5:
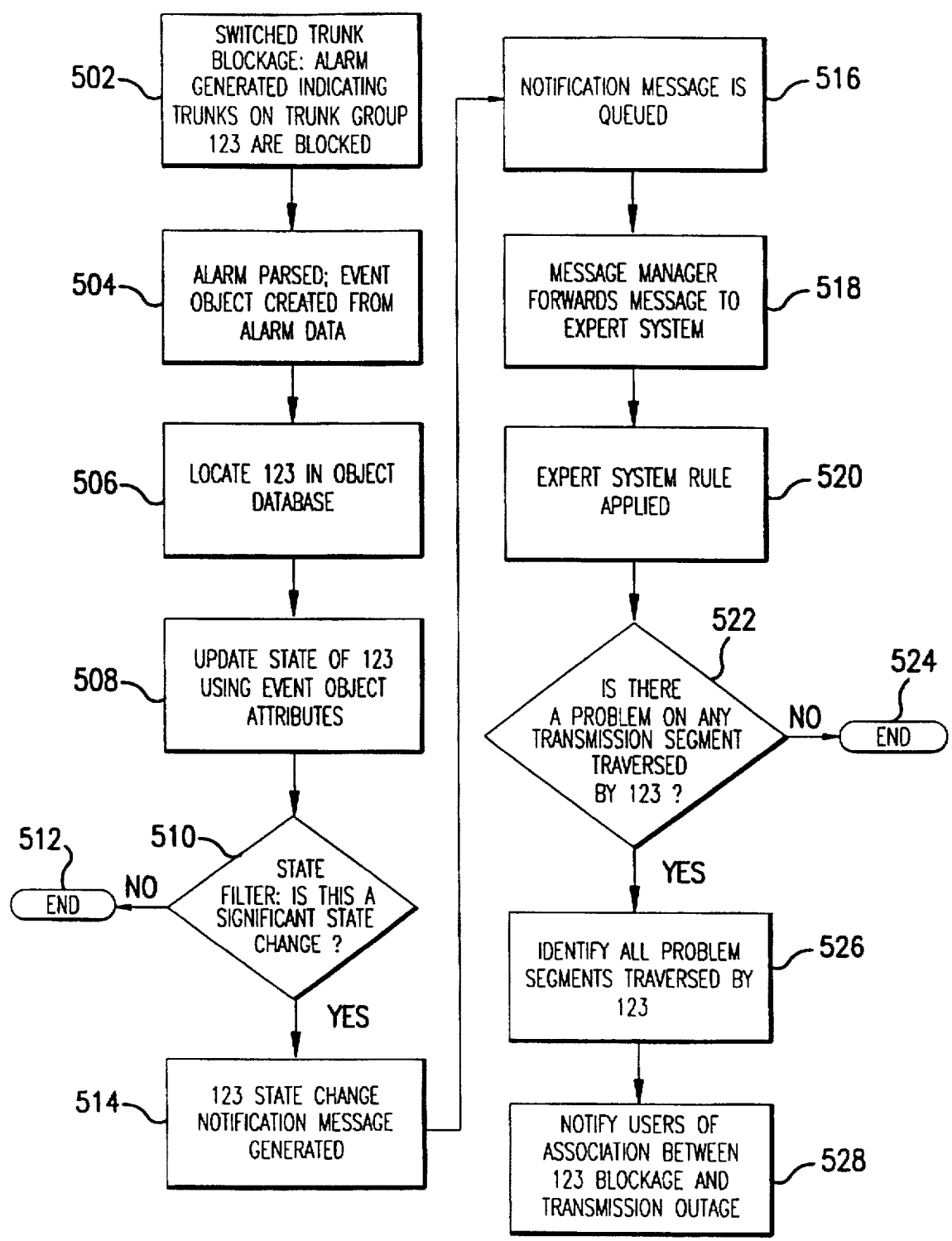
FIG. 5 shows a process flowchart illustrating the operation of the present invention, using an example of call blockage on a switched trunk.

A further example of how the present invention correlates network events through state management is provided in FIG. 5. The process of identifying blocked trunks and correlating them to a transmission outage is illustrated in FIG. 5.

When a certain threshold of trunk blockage is exceeded, a network switch generates an alarm indicating trunks on a trunk group are blocked, as shown in a step 502. The alarm is generated and the associated data are provided via conventional network mechanisms. In this particular example, the trunk group experiencing blockage is identified as 123 for illustrative purposes.

When the alarm data are received, the data are parsed by Network Event Parser 314, and an object representing the event is created in a step 504. In a step 506, the network object representing trunk group 123 is located in Network Topology Object Database 318. The state of the trunk group 123 is updated in a step 508. The event attributes of the event object created in step 504 are used to control the changes made to the impacted attributes of the 123 object. By changing the impacted attributes of the 123 object, the state of the trunk group 123 is changed.

In a step 510, a state filter is used to determine if the state change of trunk group 123 is significant enough to report. This process eliminates reporting of several trivial events that may occur, such as a negligible increase in call blockage. In a manner similar to that of step 410, the state filter of step 510 may be implemented through discrimination rules in Network Topology Object Database 318, Inferencing Engine 218, or Expert System 326.

If the state filter determines the state change is not significant, the process ends as indicated in a step 512, and the state change does not get reported or assessed. If the state filter determines the state change is significant, the process proceeds to a step 514, in which a notification message of the 123 state change is generated. This message defines how the state of 123 was changed so that the impact can be determined. In a step 516, the state change notification message is queued. A message manager reads the notification message from the queue, and forwards it to Expert System 326 in a step 518. The process up to this point parallels the one illustrated in FIG. 4.

In a step 520, Expert System 326 reads the notification message and applies the appropriate rule to assess the impact of the state change, as well as to associate or correlate this state change with other state changes. In this example, one of these other state changes may be the transmission outage identified in FIG. 4.

As in FIG. 4, the rules applied by Expert System 326 in step 520 are based on programmed heuristics that define how network entities are related, how they are impacted by various events, and how they behave. In this particular example, Expert System 326 applies or carries out the rules identified in steps 522–528. Expert System 326 examines the links in Network Topology Object Database 318 between trunk group 123 and each of the transmission segments that trunk group 123 traverses. Expert System 326 also queries the state of each transmission segment to determine if any of them are in an out-of-service state. This determination is made in a step 522. If no segments are found to be in a state of degraded service, the process ends as indicted in a step 524.

If a problem is found on any transmission segment traversed by trunk group 123, the segment is identified in a step 526. These data are presented via Presentation Manager 216 to notify the users of the determined correlation between the trunk group 123 blockage and the degraded or out-of-service state of each transmission, as indicated in a step 528.

The difference in the processes of FIGS. 4 and 5 illustrates one advantage of the present invention, i.e., its ability to perform event correlation without regard to the domain from which the notifications are received. For example, in FIG. 4, notification (step 402) is received from the transmission domain, while in FIG. 5, notification (step 502) is received from a different domain (switching). Although notification is received from different domains, the same event correlation is performed (steps 426/428 and steps 526/528).

Figure 5A:
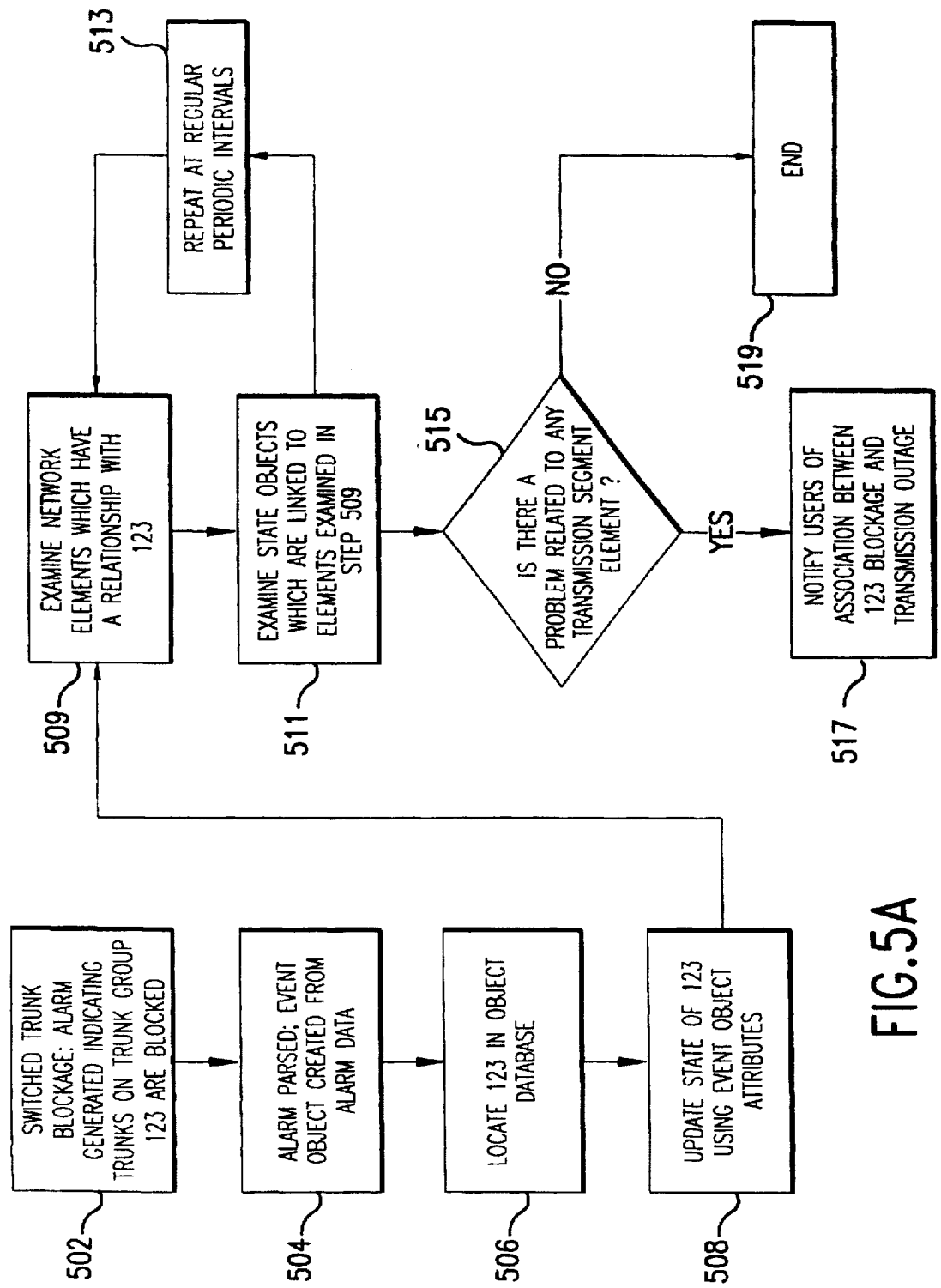
FIG. 5a shows a process flowchart illustrating the operation of an alternate embodiment of the present invention, using an example of call blockage on a switched trunk.

FIG. 5a illustrates how events are correlated without the use of Expert System 326, as can be done in an alternative embodiment of the present invention. The process operates the same as in FIG. 5 through step 508, in which the object representing the state of Trunk Group 123 is updated in accordance with the Event Object. In a step 509, Network Topology Object Database 318 is examined to identify all Network Element Objects which have a defined relationship with the Trunk Group 123 object. Network elements are related via their actual network topology, and these relationships are represented by object linkage within Network Topology Object Database 318. In this example, related network elements will include the various transmission segments that Trunk Group 123 traverses.

In a step 511, the State Objects that are linked to each Network Element Object examined in step 509 are themselves examined to detect any change in element state. These State Objects represent the state of Network Element Objects.

The examination of Network Topology Object Database 318 that occurs in step 509 is performed for all Network Element Objects that have been updated. The related Network Element Objects for each such updated Network Element Object are identified and examined in step 509. The State Objects for each such related Network Element Objects are then examined in step 511. This examination of Network Topology Object Database 318 is performed at regular periodic intervals. Thus, in a step 513, the process that occurs in steps 509 and 511 repeats; the process loop formed by steps 509, 511, and 513 runs continuously. The example illustrated in FIG. 5a uses processing on Trunk Group 123 as a single example.

If any state change of Trunk Group 123-related network elements is detected in step 511, then in a step 515 it is determined if there is a problem related to any transmission segment that was examined in steps 509 and 511. Again, the use of "transmission segment" is for the example of Trunk Group 123. Such an examination and determination is performed for all updated Network Element Objects and related Network Element Objects.

If a problem with a related transmission segment is detected in step 515, then in a step 517 the association between the Trunk Group 123 blockage and the transmission segment problem is presented to the user. This presentation is via Presentation Manager 216 and Network Management Workstation 220. The association may be presented in a number of ways, such as a table of correlations.

If no problem is detected in step 515, then no such presentation is made, and this segment of the process ends in a step 519. Of course, the process loop represented in steps 509, 511, and 513 executes continuously.

4. Conclusion

While various embodiments of the present invention have been described above, it should be understood that they have been presented by way of example only, and not limitation. The present invention can be used to manage networks of any scale, e.g., domestic, regional, international, global, etc. The present invention can also be configured for standards-based exchange using such standards as Open-Systems Interconnection (OSI) or Telecommunication Management Network (TMN). The present invention is not limited to management of a telecommunications network, and can be used in other industries. For example, the present invention could be used in the financial services industry. The present invention could be used, for example, to monitor credit card usage and provide notification for a pattern of unusual credit card usage. Thus, the breadth and scope of the present invention should not be limited by any of the above-described exemplary embodiments, but should be defined only in accordance with the following claims and their equivalents.

What is claimed is:

1. A method for managing a telecommunications network, comprising:
   (1) maintaining a network object database comprising a plurality of network objects, wherein each of said network objects corresponds to at least one of a plurality of network elements, said plurality of network elements including tangible network elements and non-tangible network elements, wherein each of said network objects is defined by a set of attributes, each of said attributes having a value that represents a current state of the corresponding network element;
   (2) receiving network event information from a plurality of network domains;
   (3) identifying each of said network objects that is impacted by said network event information as impacted network objects, wherein said impacted network objects correspond to impacted network elements;
   (4) identifying each of said attributes of said impacted network objects that is impacted by said network event information as impacted attributes;
   (5) changing the value of said impacted attributes to reflect the impact of said network event information, thereby updating the current state of said impacted network elements to incorporate a state change and correlating network event information from at least one network domain with state changes in said at least one network domain and other network domains; and
   (6) providing data reflecting the current state of said network elements and the updated current state of said impacted network elements to a network management workstation.

2. The method of claim 1, wherein step (1) further comprises:
   (a) maintaining a network topology object database containing said network objects;
   (b) maintaining a call data object database containing a plurality of call data objects, wherein each of said call data objects is defined by a set of call data attributes that correspond to data contained in network call data records; and
   (c) maintaining a traffic metrics object database containing a plurality of network traffic objects, wherein each of said network traffic objects is defined by a set of network traffic attributes that corresponds to network traffic data.

3. The method of claim 2, wherein step (2) further comprises:
   (a) parsing said network event information to identify an event; and
   (b) creating an event object defined by a set of event object attributes that corresponds to said event.

4. The method of claim 3, further comprising:
   (c) repeating steps (a) and (b) for each event contained in said network event information.

5. The method of claim 3, wherein said network event information comprises network alarms and network outage information.

6. The method of claim 3, wherein said event object attributes are used in step (5) to change the value of said impacted attributes to update the current state of said impacted network elements.

7. The method of claim 6, wherein said call data attributes and said network traffic attributes are used in step (5) to change the value of said impacted attributes to update the current state of said impacted network elements.

8. The method of claim 2, wherein said call data attributes are used in step (5) to change the value of said impacted attributes to update the current state of said impacted network elements.

9. The method of claim 2, wherein said network traffic attributes are used in step (5) to change the value of said impacted attributes to update the current state of said impacted network elements.

10. The method of claim 2, wherein said network objects in said network topology object database comprise:
    network customer objects defined by a set of network customer attributes that correspond to network customers;
    network country objects defined by a set of network country attributes that correspond to countries served by the network; and
    network service objects defined by a set of network service attributes that correspond to services performed by the network.

11. The method of claim 10, wherein said network objects in said network topology object database further comprise:
    network hardware objects defined by a set of network hardware attributes that correspond to hardware elements of the network.

12. The method of claim 11, wherein said network objects in said network topology object database further comprise:
    network route objects defined by a set of network route attributes that correspond to network routes.

13. The method of claim 12, further comprising:
    (7) receiving notification of a route change to said network routes;
    (8) identifying each of said network route objects that is impacted by said route change as impacted network route objects;
    (9) identifying each of said network route attributes of said impacted network route objects that is impacted by said route change as impacted network route attributes;
    (10) changing the value of said impacted network route attributes to reflect the impact of said route change.

14. The method of claim 11, further comprising:
    (7) receiving notification of a hardware change to said hardware elements of the network;
    (8) identifying each of said network hardware objects that is impacted by said hardware change as impacted network hardware objects;
    (9) identifying each of said network hardware attributes of said impacted network hardware objects that is impacted by said hardware change as impacted network hardware attributes;
    (10) changing the value of said impacted network hardware attributes to reflect the impact of said hardware change.

15. The method of claim 1, further comprising:
    (7) for each of said impacted network elements, determining whether said state change is a significant state change; and (8) sending a notification message to said network management workstation for each significant state change.

16. The method of claim 2, wherein step (1)(a) comprises:
   (i) maintaining a network state object database containing a plurality of network state objects, wherein each of said network state object is linked to a corresponding network object.

17. The method of claim 16, wherein each of said network state objects is defined by a set of network state attributes that represent the dynamic state of the corresponding network object.

18. The method of claim 10, wherein said network customer objects have a predefined relationship to said network country objects and to said network service objects.

19. The method of claim 1, wherein said plurality of network domains comprises transmission, switching, customer traffic, and network routing domains.

20. A method for managing a telecommunications network, comprising:
   (1) maintaining a network topology object database comprising a plurality of network objects, wherein each of said network objects corresponds to at least one of a plurality of network elements, said plurality of network elements including tangible network elements and nontangible network elements, wherein each of said network objects is defined by a set of attributes, each of said attributes having a value that represents a current state of the corresponding network element;
   (2) receiving network event information from a plurality of network domains;
   (3) receiving network topology information;
   (4) identifying each of said network objects that is impacted by said network event information, and each of said network objects that is impacted by said network topology information, as impacted network objects, wherein said impacted network objects correspond to impacted network elements;
   (5) identifying each of said attributes of said impacted network objects that is impacted by said network event information and said network topology information as impacted attributes;
   (6) changing the value of said impacted attributes to reflect the impact of said network event information and said network topology information, thereby updating the current state of said impacted network elements to incorporate a state change and correlating network event information from at least one network domain with state changes in said at least one network domain and other network domains;
   (7) for each of said impacted network elements, determining whether said state change is a significant state change;
   (8) for each significant state change, applying an expert system rule to produce an assessment of said significant state change and providing said assessment to a network management workstation; and
   (9) providing data reflecting the current state of said network elements and the updated current state of said impacted network elements to the network management workstation.

21. The method of claim 20, further comprising:
   (10) maintaining a call data object database containing a plurality of call data objects, wherein each of said call data objects is defined by a set of call data attributes that correspond to data contained in network call data records, wherein said call data attributes are used in step (6) to change the value of said impacted attributes to update the current state of said impacted network elements.

22. The method of claim 20, further comprising:
   (10) maintaining a traffic metrics object database containing a plurality of network traffic objects, wherein each of said network traffic objects is defined by a set of network traffic attributes that correspond to network traffic data, wherein said network traffic attributes are used in step (6) to change the value of said impacted attributes to update the current state of said impacted network elements.

23. The method of claim 20, wherein step (2) further comprises:
   (a) parsing said network event information to identify an event; and
   (b) creating an event object defined by a set of event object attributes that correspond to said event.

24. The method of claim 20, wherein said network objects in said network topology object database comprise:
   network customer objects defined by a set of network customer attributes that correspond to network customers;
   network country objects defined by a set of network country attributes that correspond to countries served by the network; and
   network service objects defined by a set of network service attributes that correspond to services performed by the network.

25. The method of claim 24, wherein said network objects in said network topology object database further comprise:
   network hardware objects defined by a set of network hardware attributes that correspond to hardware elements of the network.

26. The method of claim 25, wherein said network objects in said network topology object database further comprise:
   network route objects defined by a set of network route attributes that correspond to network routes.

27. The method of claim 26, wherein said network topology information comprises a route change to said network routes, further comprising:
   (10) identifying each of said network route objects that is impacted by said route change as impacted network route objects;
   (11) identifying each of said network route attributes of said impacted network route objects that is impacted by said route change as impacted network route attributes;
   (12) changing the value of said impacted network route attributes to reflect the impact of said route change.

28. The method of claim 25, wherein said network topology information comprises a hardware change to said hardware elements of the network, further comprising:
   (10) identifying each of said network hardware objects that is impacted by said hardware change as impacted network hardware objects;
   (11) identifying each of said network hardware attributes of said impacted network hardware objects that is impacted by said hardware change as impacted network hardware attributes;
   (12) changing the value of said impacted network hardware attributes to reflect the impact of said hardware change.

29. The method of claim 24, wherein said network customer objects have a predefined relationship to said network country objects and to said network service objects.

30. The method of claim 20, wherein said plurality of network domains comprises transmission, switching, customer traffic, and network routing domains.

31. A system for managing a telecommunications network, comprising:

a network management workstation for displaying a network state; and network information receiving and processing means communicatively coupled to said network management workstation for receiving and processing information affecting the network state, said network information receiving and processing means comprising, database maintenance means for maintaining a network topology object database comprising a plurality of network objects, wherein each of said network objects corresponds to at least one of a plurality of network elements, said plurality of network elements including tangible network elements and non-tangible network elements, wherein each of said network objects is defined by a set of attributes, each of said attributes having a value that represents a current state of the corresponding network element, event receiving means for receiving network event information from a plurality of network domains, topology receiving means for receiving network topology information, means for identifying each of said network objects that is impacted by said network event information, and each of said network objects that is impacted by said network topology information, as impacted network objects, wherein said impacted network objects correspond to impacted network elements, means for identifying each of said attributes of said impacted network objects that is impacted by said network event information and said network topology information as impacted attributes, means for changing the value of said impacted attributes to reflect the impact of said network event information and said network topology information, thereby updating the current state of said impacted network elements to incorporate a state change and correlating network event information from at least one network domain with state changes in said at least one network domain and other network domains, means for determining whether said state change is a significant state change, means for applying an expert system rule to produce an assessment of said significant state change, means for transmitting said assessment to said network management workstation, and means for transmitting data reflecting the current state of said network elements and the updated current state of said impacted network elements to said network management workstation.

32. The system of claim 31, wherein said network information receiving and processing means further comprises:

means for maintaining a call data object database containing a plurality of call data objects, wherein each of said call data objects is defined by a set of call data attributes that correspond to data contained in network call data records.

33. The system of claim 31, wherein said network information receiving and processing means further comprises:

means for maintaining a traffic metrics object database containing a plurality of network traffic objects, wherein each of said network traffic objects is defined by a set of network traffic attributes that correspond to network traffic data.

34. The system of claim 31, wherein said network information receiving and processing means further comprises:

means for parsing said network event information to identify an event; and means for creating an event object defined by a set of event object attributes that correspond to said event.

35. The system of claim 31, wherein said network information receiving and processing means further comprises:

means for generating a notification message for said significant state change, wherein said notification message triggers said means for applying to produce said assessment of said significant state change.

36. The system of claim 31, wherein said plurality of network domains comprises transmission, switching, customer traffic, and network routing domains.

37. A computer program product comprising a computer useable medium having computer program logic recorded thereon for enabling a processor in a computer system to manage a telecommunications network, said computer program logic comprising:

database maintenance means for enabling the processor to maintain a network topology object database comprising a plurality of network objects, wherein each of said network objects corresponds to at least one of a plurality of network elements, said plurality of network elements including tangible network elements and non-tangible network elements, wherein each of said network objects is defined by a set of attributes, each of said attributes having a value that represents a current state of the corresponding network element;

event receiving means for enabling the processor to receive network event information from a plurality of network domains;

topology receiving means for enabling the processor to receive network topology information;

impacted network object identifying means for enabling the processor to identify each of said network objects that is impacted by said network event information, and each of said network objects that is impacted by said network topology information, as impacted network objects, wherein said impacted network objects correspond to impacted network elements;

impacted attribute identifying means for enabling the processor to identify each of said attributes of said impacted network objects that is impacted by said network event information and said network topology information as impacted attributes;

attribute changing means for enabling the processor to change the value of said impacted attributes to reflect the impact of said network event information and said network topology information, thereby updating the current state of said impacted network elements to incorporate a state change and correlating network event information from at least one network domain with state changes in said at least one network domain and other network domains;

state change determining means for enabling the processor to determine, for each of said impacted network elements, whether said state change is a significant state change;

rule applying means for enabling the processor to apply, for each significant state change, an expert system rule to produce an assessment of said significant state change and to provide said assessment to a network management workstation; and data providing means for enabling the processor to provide data reflecting the current state of said network elements and the updated current state of said impacted network elements to the network management workstation.

38. The computer program product of claim 37, further comprising:

notification means for enabling the processer to generate, for each significant state change, a notification message that triggers said rule applying means to apply the appropriate expert system rule.

39. The computer program product of claim 37, wherein said network topology object database comprises a network state object data base containing a plurality of network state objects, wherein each of said network state objects is linked to a corresponding network object.

40. The computer program product of claim 39, wherein each of said network state objects is defined by a set of network state attributes that represent the dynamic state of the corresponding network object.

41. The computer program product of claim 37, wherein said plurality of network domains comprises transmission, switching, customer traffic, and network routing domains.

42. A computer program product comprising a computer useable medium having computer program logic recorded thereon for enabling a processor in a computer system to manage a telecommunications network, said computer program logic comprising:

database maintenance means for enabling the processor to maintain a network object database comprising a plurality of network objects, wherein each of said network objects corresponds to at least one of a plurality of network elements, said plurality of network elements including tangible network elements and non-tangible network elements, wherein each of said network objects is defined by a set of attributes, each of said attributes having a value that represents a current state of the corresponding network element;

receiving means for enabling the processor to receive network event information from a plurality of network domains;

impacted network object identifying means for enabling the processor to identify each of said network objects that is impacted by said network event information as impacted network objects, wherein said impacted network objects correspond to impacted network elements;

impacted attributes identifying means for enabling the processor to identify each of said attributes of said impacted network objects that is impacted by said network event information as impacted attributes;

attribute changing means for enabling the processor to change the value of said impacted attributes to reflect the impact of said network event information, thereby updating the current state of said impacted network elements to incorporate a state change and correlating network event information from at least one network domain with state changes in said at least one network domain and other network domains; and data providing means for enabling the processor to provide data reflecting the current state of said network elements and the updated current state of said impacted network elements to a network management workstation.

43. The computer program product of claim 42, wherein said plurality of network domains comprises transmission, switching, customer traffic, and network routing domains.

* * * * *